UNITED STATES PATENT OFFICE.

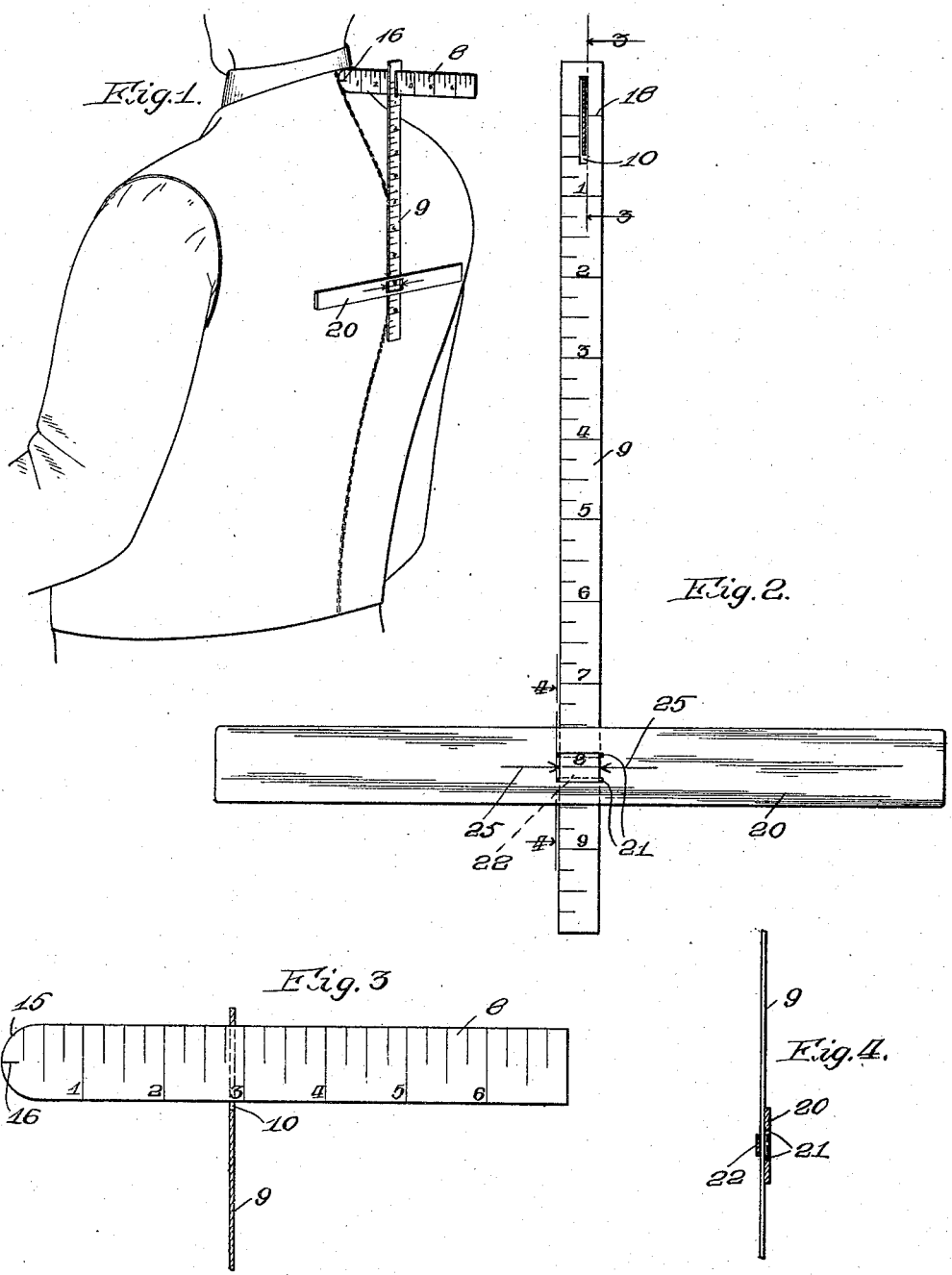

EDWARD H. YUNKERS, OF WILMETTE, ILLINOIS, ASSIGNOR TO ED V. PRICE & COMPANY, A CORPORATION OF ILLINOIS.

TAILOR'S MEASURING DEVICE.

1,183,942.  Specification of Letters Patent.  Patented May 23, 1916.

Application filed March 23, 1914. Serial No. 826,796.

*To all whom it may concern:*

Be it known that I, EDWARD H. YUNKERS, a citizen of the United States, residing at 911 Sheridan road, in Wilmette, county of Cook, and State of Illinois, have invented new and useful Improvements in Tailors' Measuring Devices, of which the following is a specification.

In the measuring of a man for the fitting of a coat or vest over the upper part of his back it is necessary to accurately determine the vertical height between points on the shoulder blades, and a point on the back of his neck; and it is also necessary to determine the horizontal distance between the first two points and the latter, as the selection of the patterns and the cutting of the cloth is somewhat determined by these dimensions.

My improved measuring device therefore includes a horizontal and a vertical scale for measuring these distances and moreover the parts are so arranged that the vertical scale can be used as a plumb line to determine accurately a vertical direction; and to also indicate by its relation to the other scale an accurate horizontal direction.

A device embodying the principles of the invention is shown in the accompanying drawings in which;

Figure 1 is a view of the device in perspective illustrating the manner of its use in measuring a man for a garment. Fig. 2 is a view of the device in elevation. Fig. 3 is a vertical section on the line 3—3 of Fig. 2. Fig. 4 is a vertical section on the line 4—4 of Fig. 2.

As shown in said drawings the device includes two rules or scales, which are so arranged when they are used together that one of them is a horizontal scale 8 and the other a vertical scale 9. The latter has a vertical slot 10 at its upper end; somewhat wider than the width of the scale 8 which is inserted therethrough, so that as the vertical scale hangs from the horizontal one it may swing backward and forward freely and act as a plumb line in determining a vertical direction. Both scales are ruled in inches and quarters, or other suitable divisions, and the horizontal scale 8 is made sufficiently wide for its horizontal position to be accurately determined by making an edge of the slot 10 in the vertical scale coincide with or hang parallel to one of the division marks on the horizontal scale. The division marks on the horizontal scale 8 commence at its forward end, which is rounded as indicated at 15 to adapt it for placing against the back of a person's neck, and in the middle of the rounded part is made a mark 16 to determine the point at the neck from which the measurements are made. The divisions on the vertical scale 9 are made from its upper end downward and the zero mark 18 is made at a point corresponding to the horizontal projection of the mark 16 so that the vertical distance may likewise be measured accurately from this point.

On the lower part of the vertical scale 9 is arranged a horizontal, sliding cross-piece or bar 20 which latter comprises a flat strip of metal having at its middle two horizontal slots 21 and the material 22 between them bent or stretched away from the plane of the cross-piece so that the scale 9 may be inserted through both slots and frictionally engaged to prevent the cross-piece from sliding downward. When the parts are thus put together a part of the vertical scale 9 will show between the two horizontal slots, and indicating marks 25, 25 on the cross-piece will indicate by the divisions on the vertical scale the vertical distance of the cross-piece below the upper reference point on the horizontal scale 8. As the shoulder blades ordinarily project backward farther than any point between them the horizontal bar 20 is adjusted to indicate by its contact with them the vertical distance of these two points below the upper reference point 16; and a reading on the scale 8 is taken to likewise indicate the horizontal distance of these two points back of the point on the neck from which the measurements are made. In such use of the device the weight of the cross-piece 20 adds to the effectiveness of the vertical scale 9 in its function as a plumb line. If, however, it is desired to make the horizontal and vertical measurements to a point between the shoulder blades, the horizontal bar 20 may be removed and a reading taken on the vertical scale where it is tangent to the rounded back.

An advantage of my improved device over any similar device heretofore in use is its very simple manner of operation requiring only one hand, as the part 8 may be held in one hand and the vertical scale slid inward and outward with the fingers while the position of the horizontal bar 20 is noted on the vertical scale; and if the position of such horizontal bar is not correct the device may be removed while it is slid upward or downward, and then again tried in position until the correct indications are obtained.

I claim as my invention:

In a tailor's measuring device, a wide scale having marks thereon and adapted to be held horizontally, a vertical scale depending therefrom and arranged to swing freely on said wide scale and also having marks thereon, the marks on such wide scale being perpendicular to its length and adapted to indicate by reference to the vertical scale the horizontal position of such wide scale, and a sliding horizontal cross-bar on such vertical scale coöperating with the marks on said vertical scale.

In witness whereof, I have hereunto subscribed my name in the presence of two witnesses this 19th day of March, 1914.

EDWARD H. YUNKERS.

Witnesses:
JOHN V. ABRAMSON,
LILLIAN E. CHRISTIANSON.

Copies of this patent may be obtained for five cents each, by addressing the "Commissioner of Patents, Washington, D. C."